US012640970B2

(12) United States Patent
Wang

(10) Patent No.: US 12,640,970 B2
(45) Date of Patent: May 26, 2026

(54) METHOD FOR REFERENCE SIGNAL PATTERN DETERMINATION, TERMINAL DEVICE, AND NON-TRANSITORY COMPUTER-READABLE STORAGE MEDIUM

(71) Applicant: BEIJING UNISOC COMMUNICATIONS TECHNOLOGY CO., LTD., Beijing (CN)

(72) Inventor: Hualei Wang, Beijing (CN)

(73) Assignee: BEIJING UNISOC COMMUNICATIONS TECHNOLOGY CO., LTD., Beijing (CN)

(*) Notice: Subject to any disclaimer, the term of this patent is extended or adjusted under 35 U.S.C. 154(b) by 359 days.

(21) Appl. No.: 18/263,459

(22) PCT Filed: Jan. 29, 2022

(86) PCT No.: PCT/CN2022/074924
§ 371 (c)(1),
(2) Date: Jul. 28, 2023

(87) PCT Pub. No.: WO2022/161487
PCT Pub. Date: Aug. 4, 2022

(65) Prior Publication Data
US 2024/0314010 A1 Sep. 19, 2024

(30) Foreign Application Priority Data
Jan. 29, 2021 (CN) .......................... 202110132783.9

(51) Int. Cl.
H04L 27/26 (2006.01)
H04L 5/00 (2006.01)

(52) U.S. Cl.
CPC .......... *H04L 27/261* (2013.01); *H04L 5/0005* (2013.01)

(58) Field of Classification Search
CPC ... H04L 27/26; H04L 5/00; H04L 5/10; H04L 25/02; H04L 1/08; H04W 24/02;
(Continued)

(56) References Cited

U.S. PATENT DOCUMENTS 8,964,705 B2 * 2/2015 Xu .......................... H04W 72/23
370/336
9,554,381 B2 * 1/2017 Park .......................... H04B 7/04
(Continued)

FOREIGN PATENT DOCUMENTS

CN 104081872 A 10/2014
CN 107318086 A 11/2017
(Continued)

OTHER PUBLICATIONS

WIPO, International Search Report and Written Opinion for International Application No. PCT/CN2022/074924, May 7, 2022.
(Continued)

*Primary Examiner* — Man U Phan
(74) *Attorney, Agent, or Firm* — HAUPTMAN HAM, LLP

(57) ABSTRACT

A method for reference signal (RS) pattern determination is provided. The method includes the following. A terminal device sends to a network device capability information that is used to instruct the network device to configure demodulation reference signal (DMRS) configuration information, receives the DMRS configuration information from the network device, and determines a DMRS pattern based on the DMRS configuration information.

15 Claims, 4 Drawing Sheets

(58) Field of Classification Search
  CPC ......... H04W 4/02; H04W 4/40; H04W 72/04;
         H04W 72/02; H04W 72/12; H04W 72/20;
         H04W 72/21; H04W 72/23; H04W 72/51
  USPC ......................................................... 370/329
  See application file for complete search history.

(56) References Cited

U.S. PATENT DOCUMENTS

| | | | | |
|---|---|---|---|---|
| 9,936,486 | B2 * | 4/2018 | You | H04L 5/0048 |
| 10,404,432 | B2 * | 9/2019 | Yuk | H04L 5/0044 |
| 10,856,280 | B2 * | 12/2020 | Noh | H04W 72/23 |
| 11,101,950 | B2 * | 8/2021 | Manolakos | H04L 25/0202 |
| 11,395,248 | B2 * | 7/2022 | Xu | H04W 56/0015 |
| 11,646,853 | B2 * | 5/2023 | Takeda | H04L 5/0041 |
| | | | | 370/329 |
| 11,777,775 | B2 * | 10/2023 | Harada | H04W 48/16 |
| | | | | 370/329 |
| 2016/0112994 | A1 | 4/2016 | Wang et al. | |
| 2019/0296876 | A1 | 9/2019 | Zhang et al. | |
| 2020/0008235 | A1 * | 1/2020 | Sarkis | H04W 72/21 |
| 2020/0204335 | A1 * | 6/2020 | Kim | H04L 27/2646 |
| 2020/0336276 | A1 * | 10/2020 | Tang | H04L 5/0051 |
| 2024/0039671 | A1 * | 2/2024 | Abdelghaffar | H04L 5/0058 |

FOREIGN PATENT DOCUMENTS

| | | |
|---|---|---|
| CN | 108111266 A | 6/2018 |
| CN | 109525999 A | 3/2019 |
| CN | 111602439 A | 8/2020 |
| CN | 111865515 A | 10/2020 |
| CN | 111869140 A | 10/2020 |
| CN | 112054886 A | 12/2020 |

OTHER PUBLICATIONS

Decision of rejection issued in corresponding CN application No. 202110132783.9 dated Mar. 31, 2025.
The first office action issued in corresponding CN application No. 202110132783.9 dated Mar. 22, 2024.
The second office action issued in corresponding CN application No. 202110132783.9 dated Nov. 27, 2024.
Notification of reexamination issued in corresponding CN application No. 202110132783.9 dated Nov. 25, 2025.

* cited by examiner

METHOD FOR REFERENCE SIGNAL PATTERN DETERMINATION, TERMINAL DEVICE, AND NON-TRANSITORY COMPUTER-READABLE STORAGE MEDIUM

CROSS-REFERENCE TO RELATED APPLICATION(S)

This application is a National Stage of International Application No. PCT/CN2022/074924, filed on Jan. 29, 2022, which claims priority to Chinese Patent Application No. 202110132783.9, filed on Jan. 29, 2021, the entire disclosure of which are incorporated herein by reference.

TECHNICAL FIELD

This disclosure relates to the technical field of communication, and in particular, to a method for reference signal (RS) pattern determination, a terminal device, and a non-transitory computer-readable storage medium.

BACKGROUND

In current new radio (NR) standard protocols, demodulation reference signals (DMRSs) includes a type 1 DMRS and a type 2 DMRS, and a network device can configure a type 1 DMRS or a type 2 DMRS via radio resource control (RRC). In a frequency domain, each DMRS port for a type 1 DMRS occupies 6 resource elements (REs) in a resource block (RB), and each DMRS port for a type 2 DMRS occupies 4 REs in an RB. In a time domain, each scheduling unit is configured with a DMRS configuration, where each scheduling unit is dependent on network configuration, and may be consisted of a front-loaded DMRS, or of a front-loaded DMRS and an additional DMRS.

At present, the use of an intelligent module at a terminal side is being considered, where channel estimation performance of a terminal device with an intelligent module may be much better than channel estimation performance of a terminal device without an intelligent module. That is, when an intelligent module is deployed at the terminal side, a sparse DMRS pattern can be provided. However, in the case where an intelligent module is introduced, there is no specific scheme regarding how to determine a sparse DMRS pattern.

SUMMARY

Implementations of the disclosure propose a method for reference signal (RS) pattern determination.

In a first aspect, implementations of the disclosure provide a method for RS pattern determination. The method is applicable to a terminal device and includes the following. Send capability information to a network device, where the capability information is used to instruct the network device to configure demodulation reference signal (DMRS) configuration information. Receive the DMRS configuration information from the network device. Determine a DMRS pattern based on the DMRS configuration information.

In a second aspect, implementations of the disclosure provide a terminal device. The terminal device includes a transceiver, a processor coupled to the transceiver, and a memory configured to store a computer program. The processor is configured to execute the computer program to cause the terminal device to perform the following. Send capability information to a network device, where the capability information is used to instruct the network device to configure DMRS configuration information. Receive the DMRS configuration information from the network device. Determine a DMRS pattern based on the DMRS configuration information.

In a third aspect, implementations of the disclosure provide a non-transitory computer-readable storage medium. The storage medium stores a computer program. The computer program is executed by a processor of a terminal device to perform the following. Send capability information to a network device, where the capability information is used to instruct the network device to configure DMRS configuration information. Receive the DMRS configuration information from the network device. Determine a DMRS pattern based on the DMRS configuration information.

BRIEF DESCRIPTION OF THE DRAWINGS

In order for clarity in elaboration of technical solutions of implementations of the disclosure, the following will give a brief introduction to the accompanying drawings used for describing the implementations. Apparently, the accompanying drawings described below are some implementations of the disclosure. Based on these drawings, those of ordinary skill in the art can also obtain other drawings without creative effort.

DETAILED DESCRIPTION

Figure 1:
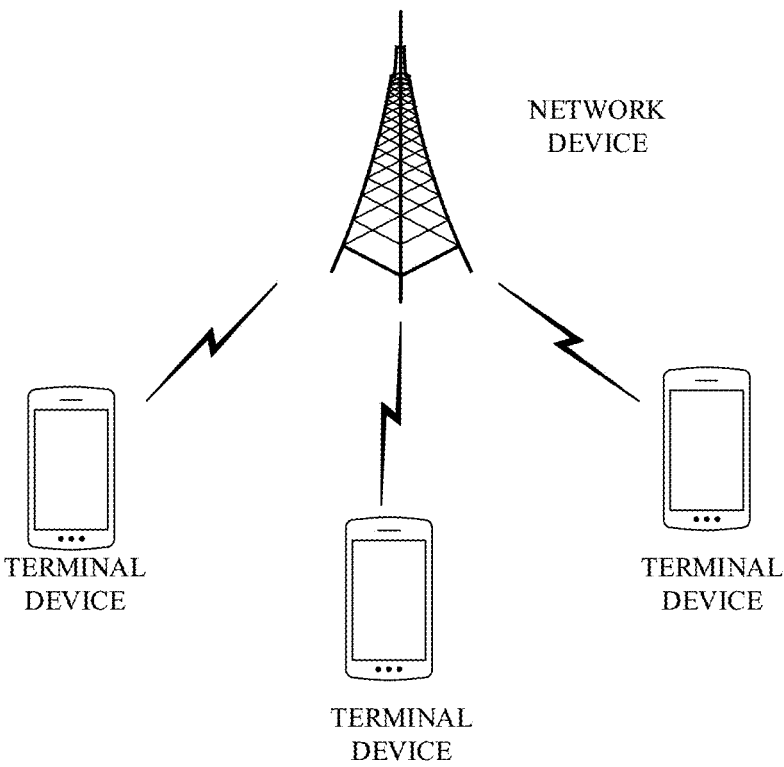
FIG. 1 is a schematic architecture diagram of a communication system provided in implementations of the disclosure.

The following will describe implementations of the disclosure with reference to the accompanying drawings in implementations of the disclosure.

It is to be understood that, technical solutions of implementations of the disclosure may be applicable to a global system of mobile communication (GSM), a code division multiple access (CDMA) system, a wideband code division multiple access (WCDMA) system, a worldwide interoperability for microwave access (Wi-MAX) system, a long term evolution (LTE) system, a 5th generation (5G) communication system (e.g., new radio (NR)), a communication system integrating multiple communication technologies (e.g., a communication system integrating LTE technology and NR technology), or various potential new communication systems, for example, a 6th generation (6G) communication system, a 7th generation (7G) communication system, and the like. Implementations of the disclosure are not limited in this regard. The technical solutions of implementations of the disclosure may be also applicable to different network architectures, including but not limited to, a relay network architecture, a dual connectivity (DC) architecture, a vehicle-to-everything communication architecture, and the like.

A terminal device may be involved in implementations of the disclosure. The terminal device may have wireless communication functions. The terminal device may be a mobile phone, a pad, a computer with wireless receiving and transmitting functions, a terminal device for virtual reality (VR), a terminal device for augmented reality (AR), a wireless terminal in industrial control, a wireless terminal in self driving, a wireless terminal in remote medical, a wireless terminal in smart grid, a wireless terminal in smart home, or the like. The terminal device may also be a device with wireless communication functions such as a handheld device, an in-vehicle device, a wearable device, a computing device, or other processing devices coupled with a wireless modem, a terminal device in a future 5G network, or a terminal device in a future evolved public land mobile network (PLMN), etc. In different networks, the terminal device may be referred to as: for example, a user equipment (UE), an access terminal, a subscriber unit, a subscriber station, a mobile station (MS), a remote station, a remote terminal, a mobile device, a user terminal, a terminal, a wireless communication device, a user agent, or a user device, a cellular radio telephone, a cordless telephone, a session initiation protocol (SIP) telephone, a wireless local loop (WLL) station, a personal digital assistant (PDA), or a terminal device in a 5G network or a future evolved network. Implementations of the disclosure are not limited in this regard.

A network device is involved in implementations of the disclosure. The network device can communicate with a terminal device, including a radio access network (RAN) device, an RAN base station controller, and a device at the core network side. For example, the network device may be an RAN base station at the access network side in a cellular network, including but not limited to, an evolved node B (eNB), a radio network controller (RNC), a node B (NB), a base station controller (BSC), a base transceiver station (BTS), a home base station (e.g., home evolved node B or home node B (HNB)), a base band unit (BBU), and a mobility management entity (MME). For another example, the network device may also be a node device in a wireless local area network (WLAN) such as an access controller (AC), a gateway, or an wireless fidelity (Wi-Fi) access point (AP). For another example, the network device may also be an access network device (e.g., a gNB, a centralized unit (CU), and a distributed unit (DU)) in an NR system and a next generation evolved node B (ng-eNB), where the gNB can communicate with the terminal device through NR technology, the ng-eNB can communicate with the terminal device through evolved universal terrestrial radio access (E-UTRA) technology, and both the gNB and the ng-eNB can connect to the 5G core network. The network device in implementations of the disclosure may also include a device providing base station functions in a potential new communication system, etc.

Referring to FIG. 1. FIG. 1 is a schematic architecture diagram of a communication system provided in implementations of the disclosure. As illustrated in FIG. 1, the communication system includes a network device and a terminal device, which is illustrated here with an example of b=3.

The network device can provide wireless access service for the terminal device, where each network device has a service coverage, and the terminal device in the coverage can communicate with the network device via wireless signals. In addition, network devices can communicate with each other.

Based on the system architecture illustrated in FIG. 1, the terminal device can receive demodulation reference signal (DMRS) configuration information sent by the network device, determine a DMRS pattern for a DMRS antenna port based on the received DMRS configuration information, and then obtain, based on the DMRS pattern, a DMRS for demodulation of each physical channel.

At present, the introduction of artificial intelligence (AI) technology at a terminal side is under extensive discussion, that is, an intelligent module is introduced at the terminal side, and channel estimation is performed with the intelligent module, so that the number of pilot symbols can be reduced, and a sparse DMRS pattern can be provided. Therefore, channel estimation performance of a terminal device with an intelligent module may be much better than channel estimation performance of a terminal device without an intelligent module, resource overhead can be reduced effectively, and network performance can be accordingly improved. Considering that different users have different intelligent capabilities. DMRS-pattern sparsity supported by different users may also be different. However, in the case where an intelligent module is introduced, there is no specific scheme regarding how to determine a sparse DMRS pattern.

In order to solve the above-mentioned problem, implementations of the disclosure propose a method for reference signal (RS) pattern determination, where with the method, considering that different terminal devices may have different intelligent capabilities, a terminal device can upload capability information of the terminal device, so that a DMRS pattern determined by the terminal device in an intelligent scenario can have DMRS-pattern sparsity supported by the terminal device, thereby effectively reducing resource overhead and improving network performance.

In order to enable those skilled in the art to better understand implementations of the disclosure, the following will describe technical solutions of implementations of the disclosure clearly and completely with reference to the accompanying drawings in implementations of the disclosure. Apparently, implementations described herein are merely some of rather than all implementations of the disclosure. Based on the implementations of the disclosure, all other implementations obtained by those of ordinary skill in the art without creative effort shall fall within the protection scope of the disclosure.

Figure 2:
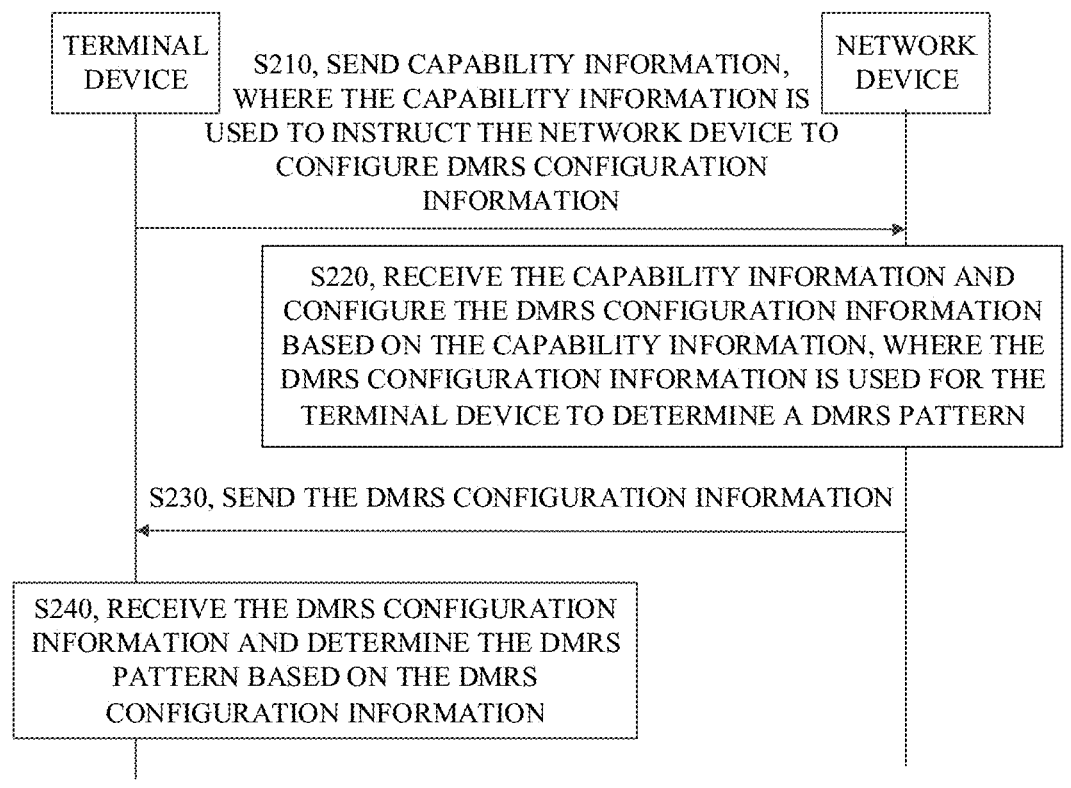
FIG. 2 is a schematic flow chart of a method for reference signal (RS) pattern determination provided in implementations of the disclosure.

Referring to FIG. 2. FIG. 2 provides a method for RS pattern determination, which is executable on a communication system illustrated in FIG. 1. The method includes the following.

S210, a terminal device sends capability information to a network device, where the capability information is used to instruct the network device to configure DMRS configuration information.

In implementations of the disclosure, considering that different terminal devices have different intelligent capabilities. DMRS-pattern sparsity supported by different terminal devices may be different. Prior to the reception of the DMRS configuration information sent by the network device, the terminal device can report the capability information, so that the network device can know the intelligent capability of the terminal device, i.e., know DMRS-pattern sparsity supportable by the terminal device, and thus the network device can configure a DMRS pattern based on the capability of the terminal device.

In a possible implementation, the capability information includes at least one of: a DMRS density in a time domain, a DMRS density in a frequency domain, or a DMRS shifting granularity in the frequency domain.

In implementations of the disclosure, since different terminal devices have different intelligent capabilities. DMRS time-domain resources supported by different terminal devices may be different, and DMRS frequency-domain resources supported by different terminal devices may be different. Therefore, by means of that the reported capability information carries a DMRS time-domain resource and a DMRS frequency-domain resource supportable by the terminal device, the DMRS pattern configured by the network device can be adapted to the capability of the terminal device.

Optionally, the DMRS density in the time domain may be any one of a gap between any two neighboring DMRS symbols, a gap between any two neighboring DMRS slots, and a gap between any two neighboring DMRS scheduling units.

Figure 3A:
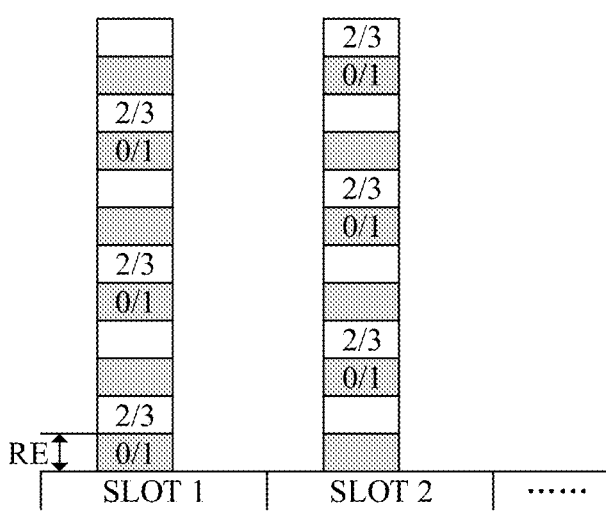
FIG. 3A is a schematic diagram illustrating a demodulation reference signal (DMRS) pattern provided in implementations of the disclosure.

Specifically, a DMRS may be carried in various important physical channels such as a physical broadcast channel (PBCH), a physical downlink control channel (PDCCH), a physical downlink shared channel (PDSCH), a physical uplink control channel (PUCCH), and a physical uplink shared channel (PUSCH). The DMRS density in the time domain in the capability information indicates the time-domain resource supported by the terminal device. For example, as illustrated in FIG. 3A, in the time domain, there are DMRSs in slot 1 and DMRSs in slot 2, and therefore, the capability information indicates that the DMRS density in the time domain supported by the terminal device is 1 slot.

It is to be understood that, in implementations of the disclosure, a symbol denotes a time unit, and a symbol herein may also be referred to as an orthogonal frequency division multiplexing (OFDM) symbol. Implementations of the disclosure are not limited in this regard.

It is to be further understood that, in implementations of the disclosure, a resource unit may contain n symbols, where n is an integer greater than or equal to 2, for example, n is 7, 14, or any one of 2 to 13. Implementations of the disclosure are not limited in this regard.

Optionally, the DMRS density in the frequency domain is a gap between resource elements (REs) in the frequency domain for the same DMRS port or a gap between resource blocks (RB) in the frequency domain for the same DMRS port. A DMRS shifting granularity in the frequency domain is any one of: a shifting granularity in the frequency domain of any two neighboring DMRS symbols in the time domain for the same DMRS port, a shifting granularity in the frequency domain of any two neighboring DMRS slots in the time domain for the same DMRS port, and a shifting granularity in the frequency domain of any two neighboring DMRS scheduling units in the time domain for the same DMRS port The DMRS density in the frequency domain and the DMRS shifting granularity in the frequency domain in the capability information indicate a frequency-domain resource supported by the terminal device. In the NR system, the maximum number of DMRS ports for a DMRS is 12. Based on different DMRS configuration types, a gap between any two RBs in the frequency domain for each port or between any two REs in the frequency domain for each port may be different. A gap in the frequency domain for each DMRS port can be known through the DMRS density in the frequency domain, and a frequency-domain position of a DMRS on each DMRS port can be obtained based on the DMRS shifting granularity in the frequency domain. For example, as illustrated in FIG. 3A, in the frequency domain, there are 4 REs between a position of any one DMRS 0/1 and a position of the next DMRS 0/1, and in the time domain, there are 2 REs between a frequency-domain position of the first DMRS 0/1 in slot 2 and a frequency-domain position of the first DMRS 0/1 in slot 1. Therefore, the capability information indicates that the DMRS density in the frequency domain supported by terminal device is 4 REs, and that the DMRS shifting granularity in the frequency domain supported by terminal device is 2 REs.

It is to be understood that, in implementations of the disclosure, a DMRS pattern may also be referred to as a DMRS design. DMRS distribution information, or a DMRS attribute. The DMRS pattern can indicate a time-domain resource and a frequency-domain resource occupied by a DMRS. Implementations of the disclosure are not limited in this regard.

In another possible implementation, the capability information includes at least one of: a maximum DMRS density in the time domain, a minimum DMRS density in the time domain, a maximum DMRS density in the frequency domain, a minimum DMRS density in the frequency domain, a maximum DMRS shifting granularity in the frequency domain, or a minimum DMRS shifting granularity in the frequency domain.

In a specific implementation, the terminal device can report the maximum or minimum time-domain resource and the maximum or minimum frequency-domain resource supported by the terminal device. Based on the maximum or minimum DMRS time-frequency resource supported by the terminal device, the network device can configure a DMRS pattern that can be adapted to the capability of the terminal device.

S220, the network device receives the capability information from the terminal device and configures the DMRS configuration information based on the capability information, where the DMRS configuration information is used for the terminal device to determine a DMRS pattern.

Optionally, the DMRS configuration information includes at least one of: a reference DMRS pattern, the DMRS density in the time domain, the DMRS density in the frequency domain, or the DMRS shifting granularity in the frequency domain.

Figure 3B:
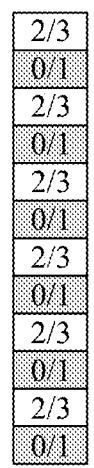
FIG. 3B is a schematic diagram illustrating a reference DMRS pattern provided in implementations of the disclosure.

Specifically, based on the supporting DMRS time-frequency resource reported by the terminal device or the supporting maximum or minimum DMRS time-frequency resource reported by the terminal device, the network device can configure for the terminal device the reference DMRS pattern that can be adapted to the capability of the terminal device. For example, if the maximum DMRS density in the time domain in the capability information is 1 slot and the maximum DMRS density in the frequency domain in the capability information is 4 REs, the reference DMRS pattern configured by the network device may be a DMRS pattern as illustrated in FIG. 3B.

Exemplarily, upon reception of the supporting DMRS time-frequency resource reported by the terminal device or the supporting maximum or minimum DMRS time-frequency resource reported by the terminal device, the network device can also directly configure the time-frequency resource that can be adapted to the capability of the terminal device. For example, if the DMRS density in the time domain in the capability information is 3 slots, the DMRS density in the frequency domain in the capability information is 6 REs, and the DMRS shifting granularity in the frequency domain in the capability information is 2, the network device can configure for the terminal device that the DMRS density in the time domain is 1 slot, the DMRS density in the frequency domain is 4 REs, and the DMRS shifting granularity in the frequency domain is 1 RE.

S230, the network device sends the DMRS configuration information to the terminal device.

In implementations of the disclosure, the network device can send the configured DMRS configuration information to the terminal device in a preset manner. The network device can send the DMRS configuration information via high-layer signaling, a medium access control (MAC) layer command, downlink control information (DCI), system information, etc.

Optionally: the DMRS configuration information is carried in at least one of a radio resource control (RRC) message, a MAC message, or DCI.

Specifically: the network device sends to the terminal device a message such as an RRC message, an MAC message, and/or DCI, where the message carries the DMRS configuration information, and the DMRS configuration information is used to configure or indicate the DMRS pattern adopted by the terminal device. The RRC message may include, but is not limited to, an RRC release message, an RRC connection reconfiguration message, an RRC connection reestablishment message, an RRC connection setup message, an RRC connection resume message, or any one of other RRC messages. The MAC message may be an MAC control element (MAC CE).

Exemplarily, the DMRS configuration information may be further carried in system information (e.g., a system information block broadcast by a network device) or additional control information.

S240, the terminal device receives the DMRS configuration information from the network device and determines the DMRS pattern based on the DMRS configuration information.

In implementations of the disclosure, upon reception of the DMRS configuration information configured by the network device, the terminal device determines a DMRS pattern for use based on the reference DMRS pattern, the DMRS density in the time domain, the DMRS density in the frequency domain, the DMRS shifting granularity in the frequency domain, and resource scheduling for the terminal device. For example, the network device configures via an RRC message a reference DMRS pattern as illustrated in FIG. 3B. In the case where the network device indicates via an RRC message that the DMRS density in the time domain is 1 slot, that the DMRS density in the frequency domain in an RB is 4 REs, and that the DMRS shifting granularity in the frequency domain is 2 REs, and a PDSCH or PUSCH scheduled for the terminal device occupies two slots, the terminal device can determine that a DMRS pattern for the terminal device is a DMRS pattern as illustrated in FIG. 3A.

Figure 3C:
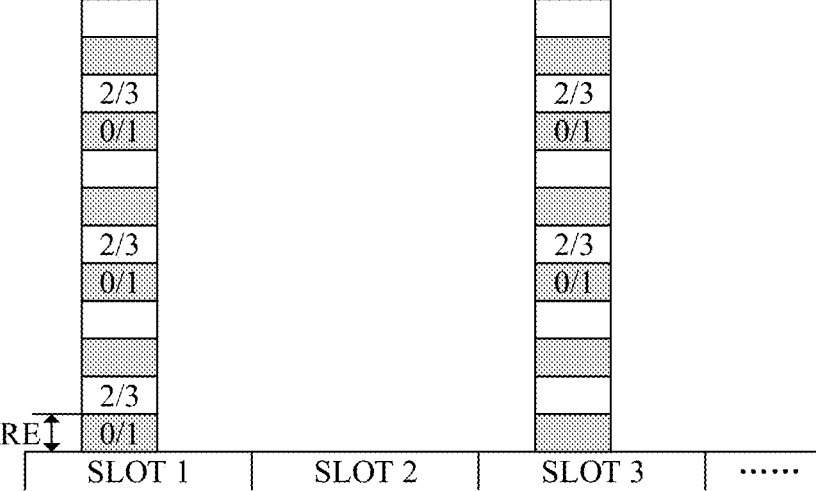
FIG. 3C is a schematic diagram illustrating a DMRS pattern provided in implementations of the disclosure.

In another example, the network device configures via DCI a reference DMRS pattern as illustrated in FIG. 3B. In the case where the network device indicates via DCI that the DMRS density in the time domain is 2 slots, that the DMRS density in the frequency domain in an RB is 4 REs, and that the DMRS shifting granularity in the frequency domain is 4 REs, and a PDSCH or PUSCH scheduled for the terminal device occupies two slots, the terminal device determines that a DMRS pattern for the terminal device is a DMRS pattern as illustrated in FIG. 3C.

As can be seen, in the method for RS pattern determination proposed in implementations of the disclosure, the terminal device sends the capability information to the network device, the network device configures the DMRS configuration information based on the capability information and sends the DMRS configuration information, and upon reception of the DMRS configuration information, the terminal device determines the DMRS pattern based on the DMRS configuration information. In the disclosure, considering that different terminal devices have different intelligent capabilities, by means of uploading the capability information of the terminal device, the DMRS pattern determined by the terminal device in an intelligent scenario can have a DMRS-pattern sparsity supported by the terminal device, and thus resource overhead can be effectively reduced and network performance can be accordingly improved.

As described above, the solutions of implementations of the disclosure are mainly described from a perspective of the method. It is to be understood that, in order to implement the foregoing functions, the electronic device includes various hardware structures and/or software modules for implementing various functions of the electronic device. The person skilled in the art can be readily aware that, with reference to units and operations of various examples described in implementations of the disclosure, the disclosure can be implemented in the form of hardware or in combination of hardware and computer software. Whether a function is implemented in the form of hardware or in the form of driving a hardware by a computer software depends on specific applications and design constraints of the technical solutions. The skilled professionals can use different methods to implement the described functions for each specific application, but such implementation shall not be considered as going beyond the scope of the disclosure.

Figure 4:
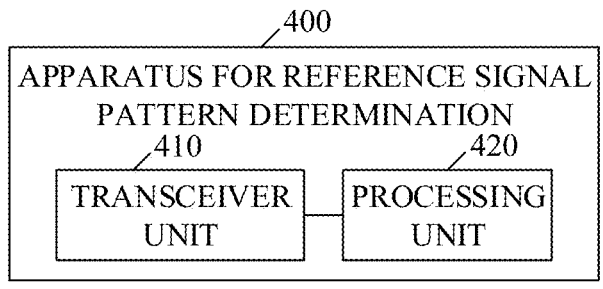
FIG. 4 is a schematic structural diagram of an apparatus for RS pattern determination provided in implementations of the disclosure.

Referring to FIG. 4. FIG. 4 is a block diagram of functional units of an apparatus 400 for RS pattern determination provided in implementations of the disclosure. The apparatus 400 may be a terminal device. Alternatively, the apparatus 400 may be a network device. The apparatus 400 includes a transceiver unit 410 and a processing unit 420.

In a possible implementation, the apparatus 400 is configured to perform various procedures and operations performed by the terminal device in the foregoing method for RS pattern determination.

The transceiver unit 410 is configured to send capability information to a network device, where the capability information is used to instruct the network device to configure demodulation reference signal (DMRS) configuration information.

The transceiver unit 410 is further configured to receive the DMRS configuration information from the network device.

The processing unit 420 is configured to determine a DMRS pattern based on the DMRS configuration information.

Optionally, the capability information includes at least one of: a DMRS density in a time domain, a DMRS density in a frequency domain, or a DMRS shifting granularity in the frequency domain.

Optionally, the capability information includes at least one of: a maximum DMRS density in the time domain, a minimum DMRS density in the time domain, a maximum DMRS density in the frequency domain, a minimum DMRS density in the frequency domain, a maximum DMRS shifting granularity in the frequency domain, or a minimum DMRS shifting granularity in the frequency domain.

Optionally, the DMRS configuration information includes at least one of: a reference DMRS pattern, the DMRS density in the time domain, the DMRS density in the frequency domain, or a DMRS shifting granularity in the frequency domain.

Optionally, the DMRS density in the time domain is any one of a gap between any two neighboring DMRS symbols, a gap between any two neighboring DMRS slots, and a gap between any two neighboring DMRS scheduling units.

Optionally: the DMRS density in the frequency domain is a gap between resource elements (REs) in the frequency domain for the same DMRS port or a gap between resource blocks (RB) in the frequency domain for the same DMRS port Optionally, a DMRS shifting granularity in the frequency domain is any one of: a shifting granularity in the frequency domain of any two neighboring DMRS symbols in the time domain for the same DMRS port, a shifting granularity in the frequency domain of any two neighboring DMRS slots in the time domain for the same DMRS port, and a shifting granularity in the frequency domain of any two neighboring DMRS scheduling units in the time domain for the same DMRS port.

Optionally, the DMRS configuration information is carried in at least one of an RRC message, an MAC message, or DCI.

In another possible implementation, the apparatus 400 is configured to perform various procedures and operations performed by the network device in the foregoing method for RS pattern determination.

The transceiver unit 410 is configured to receive capability information from a terminal device.

The processing unit 420 is configured to configure DMRS configuration information based on the capability information, where the DMRS configuration information is used for the terminal device to determine a DMRS pattern.

The transceiver unit 410 is further configured to send the DMRS configuration information to the terminal device.

Optionally, the capability information includes at least one of: a DMRS density in a time domain, a DMRS density in a frequency domain, or a DMRS shifting granularity in the frequency domain.

Optionally, the capability information includes at least one of: a maximum DMRS density in the time domain, a minimum DMRS density in the time domain, a maximum DMRS density in the frequency domain, or a minimum DMRS density in the frequency domain, a maximum DMRS shifting granularity in the frequency domain, or a minimum DMRS shifting granularity in the frequency domain.

Optionally, the DMRS configuration information includes at least one of: a reference DMRS pattern, the DMRS density in the time domain, the DMRS density in the frequency domain, or a DMRS shifting granularity in the frequency domain.

Optionally, the DMRS density in the time domain is any one of a gap between any two neighboring DMRS symbols, a gap between any two neighboring DMRS slots, and a gap between any two neighboring DMRS scheduling units.

Optionally, the DMRS density in the frequency domain is a gap between REs in the frequency domain for the same DMRS port or a gap between RBs in the frequency domain for the same DMRS port.

Optionally, the DMRS shifting granularity in the frequency domain is any one of: a shifting granularity in the frequency domain of any two neighboring DMRS symbols in a time domain for the same DMRS port, a shifting granularity in the frequency domain of any two neighboring DMRS slots in the time domain for the same DMRS port, and a shifting granularity in the frequency domain of any two neighboring DMRS scheduling units in the time domain for the same DMRS port.

Optionally, the DMRS configuration information is carried in at least one of an RRC message, a MAC message, and DCI.

It is to be understood that, in implementations of the disclosure, the functions of each program module of the apparatus for RS pattern determination can be specifically implemented according to the methods in the foregoing method implementations. For specific implementations, reference can be made to relevant illustrations of the foregoing method implementations, which will not be described here.

It is to be understood that the apparatus 400 herein is embodied in the form of functional units. The term "unit" herein may refer to an application specific integrated circuit (ASIC), an electronic circuit, a processor (e.g., a shared processor, a dedicated processor, or a group processor, etc.) for executing one or more software or firmware programs and a memory, an integrated logic circuit, and/or other appropriate components that can support the described functions. In an optional example, it is to be understood by the person skilled in the art that the apparatus 400 may be specifically a terminal device or a network device in the foregoing implementations, and that the apparatus 400 may be configured to perform various procedures and/or operations performed by the terminal device or the network device in the foregoing method implementations, which will not be repeated here.

The apparatus 400 of each of the foregoing solutions has a function of implementing the corresponding operations performed by the terminal device or the network device in the foregoing methods. The function can be implemented in the form of hardware or in the form of executing software by hardware. The hardware or software includes one or more modules for implementing the foregoing function. For example, the processing unit 420 may be replaced by a processor to perform relevant processing operations in various method implementations, and the transceiver unit 410 may be replaced by a transmitter and a receiver to perform the transmitting and receiving operations in various method implementations.

In implementations of the disclosure, the apparatus 400 in FIG. 4 may also be a chip, a chip module, a UE, or a system on chip (SoC). Correspondingly, the transceiver unit 410 may be a transceiver circuit of the chip, which is not limited in this regard.

Figure 5:
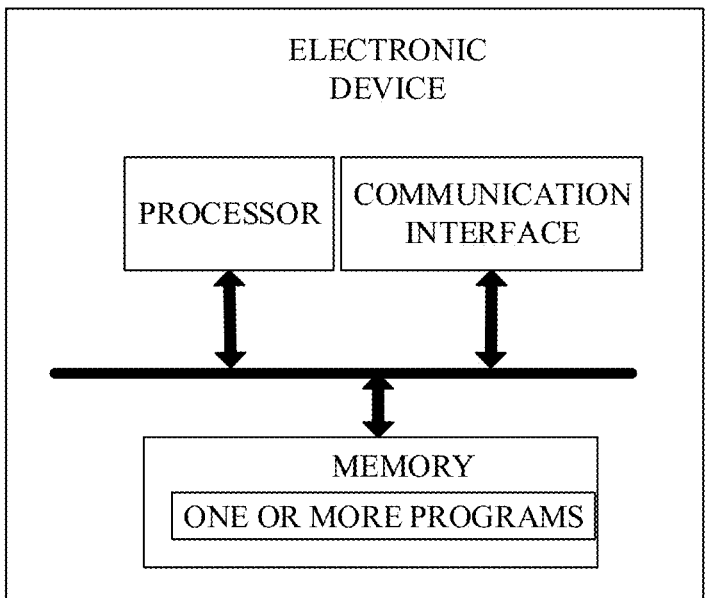
FIG. 5 is a schematic structural diagram of an electronic device provided in implementations of the disclosure.

Referring to FIG. 5. FIG. 5 is an electronic device provided in implementations of the disclosure. The electronic device includes: one or more processors, one or more memories, one or more communication interfaces, and one or more programs. The one or more programs are stored in the one or more memories and configured to be executed by the one or more processors.

In a possible implementation, the electronic device is a terminal device. The foregoing program(s) contains instructions for performing the following. Send capability information of the terminal device to a network device, where the capability information is used to instruct the network device to configure DMRS configuration information. Receive the DMRS configuration information from the network device. Determine a DMRS pattern based on the DMRS configuration information.

In another possible implementation, the electronic device is a network device. The foregoing program(s) contains instructions for performing the following. Receive capability information from a terminal device. Configure DMRS configuration information based on the capability information, where the DMRS configuration information is used for the terminal device to determine a DMRS pattern. Send the DMRS configuration information to the terminal device.

All relevant contents of various scenarios involved in the foregoing method implementations can be applied to the functional illustrations of the corresponding functional modules, which will not be repeated here.

It is to be understood that the foregoing memories may include a read-only memory (ROM) and a random access memory (RAM), and may be configured to provide instructions and data for the processor. A part of the memories may further include a non-volatile RAM (NVRAM). For example, the memories may further store information on the device type.

In implementations of the disclosure, the processor of the foregoing apparatus may be a central processing unit (CPU), or may also be another general-purpose processor, a digital signal processor (DSP), an application specific integrated circuits (ASIC), a field programmable gate array (FPGA), or other programmable logic device, a discrete gate or a transistor logic device, a discrete hardware component, etc. The general-purpose processor may be a microprocessor, or the processor may be any conventional processor or the like.

It is to be understood that, in implementations of the disclosure. "at least one" refers to one or more, and "more". "multiple", and "a plurality of" refers to two or more. The term "and/or" herein describes an association relationship between associated objects, which means that there can be three relationships. For example. A and/or B can mean A alone, both A and B exist, and B alone, where A and B can be singular or plural. In addition, the character "/" herein generally indicates that the associated objects are in an "or" relationship. The expression "at least one of items" or the similar expressions refer to any combination of the items, including any combination of singular or plural items. For example, at least one of a, b, or c can mean a, b, c, a and b, a and c, b and c, or a and b and c, where a, b, and c may be singular or plural.

Furthermore, unless otherwise specified, in implementations of the disclosure, the ordinal numerals such as "first" and "second" is used for distinguishing multiple objects, which is not for limiting the order, timing sequence, priorities, or importance of multiple objects. For example, first information and second information are used only to distinguish different information rather than indicate a difference in content, priority, sending sequence, or importance of the first information and the second information.

During implementation, each operation of the foregoing methods may be completed by a hardware integrated logic circuit in the processor or an instruction in the form of software. The operations of the method disclosed in implementations of the disclosure may be directly implemented by a hardware processor, or may be performed by hardware and software units in the processor. The software unit can be located in a storage medium mature in the skill such as an RAM, a flash memory, an ROM, a programmable ROM (PROM), an electrically erasable programmable memory: registers, or the like. The storage medium is located in the memory. The processor performs the instruction in the memory, and completes the operations of the method described above with the hardware thereof, which will not be illustrated in detail here to avoid repetition.

Implementations of the disclosure further provide a chip. The chip is configured to output capability information to a network device, where the capability information is used to instruct the network device to configure DMRS configuration information. The chip is further configured to obtain the DMRS configuration information from the network device.

The chip is further configured to determine a DMRS pattern through processing the DMRS configuration information.

Implementations of the disclosure further provide a chip module. The chip module includes a transceiver assembly and a chip. The chip is configured to send capability information to a network device via the transceiver assembly, where the capability information is used to instruct the network device to configure DMRS configuration information. The chip is further configured to receive the DMRS configuration information from the network device via the transceiver assembly. The chip is further configured to determine a DMRS pattern through processing the DMRS configuration information.

Implementations of the disclosure further provide a chip. The chip is configured to obtain capability information from a terminal device. The chip is further configured to configure DMRS configuration information through processing the capability information, where the DMRS configuration information is used for the terminal device to determine a DMRS pattern. The chip is further configured to output the DMRS configuration information to the terminal device.

Implementations of the disclosure further provide a chip module. The chip module includes a transceiver assembly and a chip. The chip is configured to receive capability information from a terminal device via the transceiver assembly. The chip is further configured to configure DMRS configuration information through processing the capability information, where the DMRS configuration information is used for the terminal device to determine a DMRS pattern. The chip is further configured to send the DMRS configuration information to the terminal device via the transceiver assembly.

Implementations of the disclosure further provide a computer storage medium. The computer storage medium is configured to store a computer program for electronic data interchange (EDI), where the computer program is operable with a computer to execute part or all of the operations in any one of the methods described in the foregoing method implementations.

Implementations of the disclosure further provide a computer program product. The foregoing computer program product includes a non-transitory computer-readable storage medium storing a computer program, where the foregoing computer program is operable with a computer to execute part or all of operations in any one of the methods described in the foregoing method implementations. The computer program product may be a software installation package.

It is to be noted that, for the sake of simplicity, the foregoing method implementations are described as a series of action combinations. However, it will be appreciated by those skilled in the art that the disclosure is not limited by the sequence of actions described. According to the disclosure, some operations may be performed in other orders or simultaneously. In addition, it will be appreciated by those skilled in the art that the implementations described in the specification are preferred implementations, and the actions and modules involved are not necessarily essential to the disclosure.

In the foregoing implementations, the description of each implementation has its own emphasis. For the parts not described in detail in one implementation, reference may be made to related descriptions in other implementations.

In several implementations provided in the disclosure, it will be appreciated that the apparatuses disclosed may be implemented in various other manners. For example, the above apparatus implementations are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, apparatuses, or units, and may be electrical, or otherwise.

Units illustrated as separated parts may or may not be physically separated. Components displayed as units may or may not be physical units, and may reside at one location or may be distributed to multiple networked units. Part or all of the units may be selectively adopted according to practical needs to achieve desired objectives of the solutions of implementations of the disclosure.

In addition, various functional units described in various implementations of the disclosure may be integrated into one processing unit or may be present as a number of physically separated units, and two or more units may be integrated into one. The above integrated units may be implemented either in the form of hardware or in the form of software functional units.

If the above integrated units are implemented as software functional units and sold or used as standalone products, they may be stored in a computer-readable storage medium. Based on such an understanding, the essential technical solution, or the portion that contributes to the prior art, or part or all of the technical solution of the disclosure may be embodied as software products. The computer software products can be stored in a memory and may include multiple instructions that, when executed, can cause a computing device (e.g., a personal computer, a server, or a TRP, etc.) to execute some or all operations of the methods described in various implementations of the disclosure. The above memory may include various kinds of media that can store program codes, such as a universal serial bus (USB) flash disk, an ROM, an RAM, a mobile hard drive, a magnetic disk, or an optical disk.

It will be understood by those of ordinary skill in the art that all or part of the operations of the various methods in the implementations described above may be accomplished by means of a program to instruct associated hardware, and the program may be stored in a computer-readable memory, which may include a flash disk, an ROM, an RAM, a magnetic disk, or an optical disk.

The above implementations in the disclosure are introduced in detail. Principles and implementation manners of the disclosure are elaborated with specific implementations herein. The illustration of implementations above is only used to help understanding of methods and core ideas of the disclosure. At the same time, for those of ordinary skill in the art, according to ideas of the disclosure, there will be changes in the specific implementation manners and application scope. In summary, contents of this specification should not be understood as limitation on the disclosure.

What is claimed is:

1. A method for reference signal (RS) pattern determination, applicable to a terminal device and comprising:
sending capability information to a network device, the capability information being used to instruct the network device to configure demodulation reference signal (DMRS) configuration information;
receiving the DMRS configuration information from the network device; and
determining a DMRS pattern based on the DMRS configuration information;

wherein the capability information comprises a DMRS shifting granularity in a frequency domain,
wherein the DMRS configuration information comprises the DMRS shifting granularity in the frequency domain, and
wherein the DMRS shifting granularity in the frequency domain is any one of: a shifting granularity in the frequency domain of any two neighboring DMRS symbols in a time domain for a same DMRS port, a shifting granularity in the frequency domain of any two neighboring DMRS slots in the time domain for the same DMRS port, and a shifting granularity in the frequency domain of any two neighboring DMRS scheduling units in the time domain for the same DMRS port.

2. The method of claim 1, wherein the capability information further comprises at least one of: a DMRS density in the time domain, or a DMRS density in the frequency domain.

3. The method of claim 2, wherein the DMRS configuration information further comprises at least one of: a reference DMRS pattern, the DMRS density in the time domain, or the DMRS density in the frequency domain.

4. The method of claim 3, wherein the DMRS density in the time domain is any one of a gap between any two neighboring DMRS symbols, a gap between any two neighboring DMRS slots, and a gap between any two neighboring DMRS scheduling units.

5. The method of claim 3, wherein the DMRS density in the frequency domain is a gap between resource elements (REs) in the frequency domain for the same DMRS port or a gap between resource blocks (RBs) in the frequency domain for the same DMRS port.

6. The method of claim 1, wherein the DMRS configuration information is carried in at least one of a radio resource control (RRC) message, a medium access control (MAC) message, or downlink control information (DCI).

7. A terminal device comprising:
a transceiver;
a processor coupled to the transceiver; and
a memory storing a computer program;
the processor executing the computer program to cause the terminal device to:
send capability information to a network device, and receive demodulation reference signal (DMRS) configuration information from the network device, the capability information being used to instruct the network device to configure the DMRS configuration information; and
determine a DMRS pattern based on the DMRS configuration information,
wherein the capability information comprises a DMRS shifting granularity in a frequency domain,
wherein the DMRS configuration information comprises the DMRS shifting granularity in the frequency domain, and
wherein the DMRS shifting granularity in the frequency domain is any one of: a shifting granularity in the frequency domain of any two neighboring DMRS symbols in a time domain for a same DMRS port, a shifting granularity in the frequency domain of any two neighboring DMRS slots in the time domain for the same DMRS port, and a shifting granularity in the frequency domain of any two neighboring DMRS scheduling units in the time domain for the same DMRS port.

8. The terminal device of claim 7, wherein the capability information further comprises at least one of: a DMRS density in the time domain, or a DMRS density in the frequency domain.

9. The terminal device of claim 8, wherein the DMRS configuration information further comprises at least one of: a reference DMRS pattern, the DMRS density in the time domain, or the DMRS density in the frequency domain.

10. The terminal device of claim 9, wherein the DMRS density in the time domain is any one of a gap between any two neighboring DMRS symbols, a gap between any two neighboring DMRS slots, and a gap between any two neighboring DMRS scheduling units.

11. The terminal device of claim 9, wherein the DMRS density in the frequency domain is a gap between resource elements (REs) in the frequency domain for the same DMRS port or a gap between resource blocks (RBs) in the frequency domain for the same DMRS port.

12. The terminal device of claim 7, wherein the DMRS configuration information is carried in at least one of a radio resource control (RRC) message, a medium access control (MAC) message, or downlink control information (DCI).

13. A non-transitory computer-readable storage medium storing a computer program, the computer program being executed by a processor of a terminal device to cause the terminal device to perform:

sending capability information to a network device, the capability information being used to instruct the network device to configure demodulation reference signal (DMRS) configuration information;

receiving the DMRS configuration information from the network device; and determining a DMRS pattern based on the DMRS configuration information, wherein the capability information comprises a DMRS shifting granularity in a frequency domain, wherein the DMRS configuration information comprises the DMRS shifting granularity in the frequency domain, and wherein the DMRS shifting granularity in the frequency domain is any one of: a shifting granularity in the frequency domain of any two neighboring DMRS symbols in a time domain for a same DMRS port, a shifting granularity in the frequency domain of any two neighboring DMRS slots in the time domain for the same DMRS port, and a shifting granularity in the frequency domain of any two neighboring DMRS scheduling units in the time domain for the same DMRS port.

14. The non-transitory computer-readable storage medium of claim 13, wherein the capability information further comprises at least one of: a DMRS density in the time domain, or a DMRS density in the frequency domain.

15. The non-transitory computer-readable storage medium of claim 14, wherein the DMRS configuration information further comprises at least one of: a reference DMRS pattern, the DMRS density in the time domain, or the DMRS density in the frequency domain.

* * * * *